United States Patent [19]

Kitahara et al.

[11] Patent Number: 4,760,298

[45] Date of Patent: Jul. 26, 1988

[54] MAGNETIC DISK MOTOR HAVING A CUP-SHAPED ROTOR

[75] Inventors: Haruo Kitahara, Iijima; Takeshi Ohshita, Ina, both of Japan

[73] Assignee: Shinano Tokki Corporation, Nagano, Japan

[21] Appl. No.: 106,626

[22] Filed: Oct. 6, 1987

[30] Foreign Application Priority Data

May 8, 1987 [JP] Japan ................................ 62-110786

[51] Int. Cl.[4] .......................... H02K 5/16; H02K 7/08; B23B 19/02; G11B 25/04

[52] U.S. Cl. .................................... 310/67 R; 310/90; 384/517; 384/563

[58] Field of Search ...................... 310/42, 67 R, 68 R, 310/90, 268; 360/97; 384/517, 535, 563, 611, 620

[56] References Cited

U.S. PATENT DOCUMENTS 2,433,518 12/1947 Ljunggren .......................... 384/517
4,471,250 9/1984 Snider .............................. 310/67 R
4,480,881 11/1984 Fujimori .............................. 310/90
4,580,471 4/1986 Oyama et al. ......................... 310/90
4,604,665 8/1986 Müller et al. ...................... 310/67 R
4,672,250 6/1987 Seitz ................................ 310/67 R

*Primary Examiner*—Patrick R. Salce
*Assistant Examiner*—D. L. Rebsch
*Attorney, Agent, or Firm*—Welsh & Katz, Ltd.

[57] ABSTRACT

A motor for rotating a magnetic disk comprises an armature concentrically secured to a center shaft affixed to a mounting frame. A rotor frame having a cylindrical side wall of uniform outside diameter is rotatably supported in a cantilever fashion on a free end of the center shaft by a pair of bearings encircling the outer peripheral surface of the armature and a magnetic disk support that projects from the side wall. A permanent magnet secured inside the side wall is disposed to interact with magnetic fields produced by the armature. The cantilever support makes it easier to bring armature leads through a hole in the mounting frame as a part of the manufacturing process.

8 Claims, 3 Drawing Sheets

MAGNETIC DISK MOTOR HAVING A CUP-SHAPED ROTOR

BACKGROUND OF THE INVENTION

This invention relates to a motor for rotating a magnetic disk. In particular, it relates to a motor which is used for an application in which center portions of a few magnetic disks, each normally formed with a magnetic layer on an aluminum disk, are secured to a rotor frame of the motor, and data is recorded on and reproduced from the magnetic disks by magnetic heads disposed near the upper and lower surfaces of each magnetic disk.

FIG. 4 is a longitudinal sectional view showing a conventional structure of a motor for rotating and driving a magnetic disk. In FIG. 4, an upright hollow shaft 2 is formed in the center of a circular mounting frame 1 made by aluminum die casting or the like. A motor 3 has a hollow fixed shaft 4 that is pressed onto the upright hollow shaft 2. A laminated core 6 of an armature 5 is pressed and secured to an axial central portion of the hollow fixed shaft 4. Shoulders 7 are defined on both ends of the hollow fixed shaft 4 to form small-diameter portions 8 and 9. Portion 8 is slightly longer in the axial direction than portion 9, to accommodate two Belleville springs 10 that are inserted into the small-diameter portion 8 to exert force on a roller bearing 11 that will be inserted therein, and a roller bearing 14 is pressed onto the other small-diameter portion 9 and into an end plate 13 of a rotor frame 12 so that the frame 12 may be rotatably supported on the hollow fixed shaft 4. The rotor frame 12 is in the shape of a cup. An axial cylindrical side wall 54 covers an outer peripheral surface of the armature 5, an outer end of which serves as a magnetic disk support 15 bent outwardly perpendicularly and is opposed to the mounting frame 1 leaving a small clearance. An annular recess 16 formed at an inner corner of the magnetic disk support 15 is provided for a good contact between the magnetic disk support 15 and a magnetic disk placed thereon.

An annular permanent magnet 17 having the desired number of poles is pressed and secured into the cylindrical side wall 54, after which an end plate 19 is pressed and secured to the roller bearing 11. The roller bearing 11 is then pressed and secured to shaft 2, and the end plate 19 is attached to the end of the side wall 14 to form a rotor 20. The rotor 20, the armature 6 and the hollow fixed shaft 4 comprise the motor 3. A set of lead wires 22 of an armature coil 21 is drawn out of a hole 23 provided in the hollow fixed shaft 4 into a hollow portion and pulled outside through the hollow portion of the hollow shaft 2.

FIG. 5 is a sectional view of a portion of the conventional magnetic disk driving motor having the structure described above. In FIG. 5, center holes of the magnetic disks 24 are fitted on the side wall 54 of the rotor frame 12, placed on the disk receiving base 15 in a predetermined spaced relation through spacers 25, and fixed by means of a pressure plate 26 and a screw 27. In order to maintain a predetermined small clearance between the surface of each magnetic disk 24 and a radially moving magnetic head 28, vibrations resulting from rotation of the side wall 54 and magnetic external disk support 15 have to be minimized; further, the width of vertical variation of the rotating disk support 15 should be 0.005 mm or less.

However, in the aforementioned conventional construction, it is very difficult to make the lateral hole 23 through which the lead wire 22 passes in the hollow fixed shaft 4, and the number of parts is large, which increases the cost of the motor.

SUMMARY OF THE INVENTION

It is an object of the present invention to provide a motor for driving a magentic disk having a cup-shaped rotor which is designed so that the armature is secured to a mounting frame and a lead wire of the armature coil may be drawn out of a hole formed in the mounting frame, thereby reducing the cost of constructing the motor.

In one embodiment of the present invention, an armature is secured concentrically to a center shaft secured integrally on a mounting frame. A rotor frame having a cylindrical side wall of uniform outside diameter is rotatably supported in a cantilever fashion on a free end of the center shaft by means of a pair of ball bearings which encircle the outer peripheral surface of the armature. A magnetic disk support projects from said side wall, and a permanent magnet is secured inside the side wall and opposed to the outer peripheral surface of the armature, leaving an air gap.

In this embodiment of the invention, the rotor frame is supported rotatably and in a cantilever fashion on the center shaft to which is secured the armature by means of a pair of ball bearings. Therefore, even if the side wall of the rotor frame is extended so as to cover the outer periphery of the armature, no side run-out relative to the armature occurs and the rotor rotates freely. Accordingly, a magnetic disk mounted on the rotor frame may be rotated accurately without side runout or the like. In addition, since the motor is not provided with an end plate on the side of the mounting frame to encircle the armature, there are fewer parts, and the coil lead wire may be drawn outside the frame through a hole formed in the mounting frame, thus materially simplifying the construction of the whole motor.

According to a second embodiment of the present invention, a cup-shaped rotor includes an armature secured concentrically to a center axial pipe secured to a mounting frame. A rotor frame having a cylindrical side wall of uniform outside diameter is rotatably supported in a centilever fashion on a center shaft pressed and secured to a center hole of a free end of the center axial pipe by means of a pair of ball bearings. A magnetic disk support is secured to the side wall, and a permanent magnet is secured inside the side wall and opposed to the outer peripheral surface of the armature, leaving an air gap.

In this embodiment of the invention, the structure is similar to that of the first embodiment except that the rotor center shaft is pressed on and secured to the central axial pipe on the mounting frame. If the pressed length is great and the pressing accuracy is good, this embodiment has the same advantages as the first embodiment. If the mounting frame and the center axial pipe are integrally formed by aluminum die casting, the manufacturing cost is less.

DESCRIPTION OF THE PREFERRED EMBODIMENTS

Figure 1:
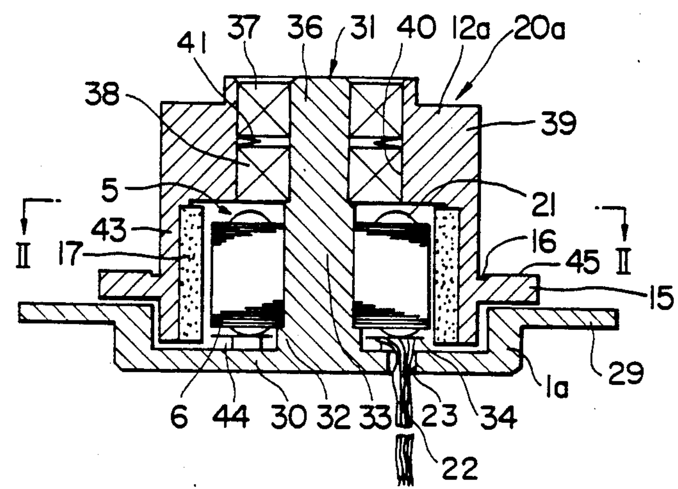
FIG. 1 is a longitudinal sectional view of one embodiment of the present invention.
Figure 4:
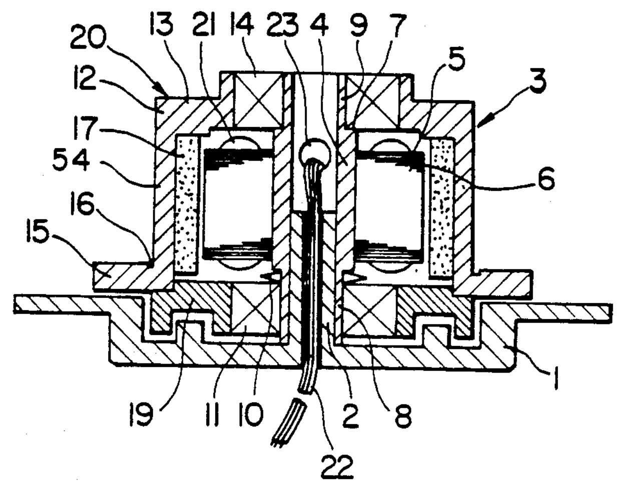
FIG. 4 is a longitudinal sectional view of a motor of the prior art.
Figure 5:
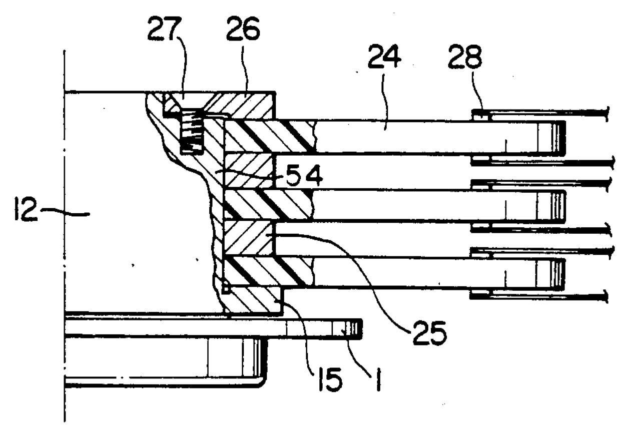
FIG. 5 is a partial sectional elevation view of a rotor of the prior art with a magnetic disk mounted.

FIG. 1 is a longitudinal sectional view of an embodiment of the invention in which parts of the same construction as those shown in FIG. 4 are indicated by the same reference numerals.

In FIG. 1, a circular mounting frame 1*a* has a center shaft 31 in the center of a dished portion 30 projecting outwardly from a flange 29. The frame 1*a* is preferably formed of steel. A laminated core 6 of an armature 5 is pressed on and secured to a middle-diameter portion 33 which abuts a lower large-diameter portion 32 at the base of the center shaft 31. The core 6 is placed in contact with the large-diameter portion 32, and lead wires 22 connected to an armature coil 21 through a printed-circuit board 34 are taken through a hole 23 formed in the dished portion 30.

The center shaft 31 is formed at its free end with a small-diameter portion 36, on which are pressed and glued or cemented the inner seats of a pair of ball bearings 37 and 38. The inner seat of the bearing 38 is brought into contact with the middle-diameter portion 33, leaving a small clearance between the bearings 37 and 38.

A steel rotor frame 12*a* constituting a rotor 20*a* is formed into a cup shape. An outer seat of the bearing 38 is pressed into and glued or cemented to a center hole 40 of a thick-wall portion 39 corresponding to the bottom of the cup. The outer seat of the bearing 37 is fitted loosely in the center hole 40. Two stacked Belleville springs 41 are compressed and interposed with appropriate pre-loading between the outer seats of the bearings 37 and 38 so that the outer seat of the bearing 37 is moved slightly in an axial direction to remove play in both axial and radial directions of the bearings 37 and 38. A cylindrical side wall 43, a uniform diameter extension of the thick-wall portion 39, is extended into a recess 44 of the dished portion 30 covering the outer peripheral surface of the core 6. An annular permanent magnet 17 is fitted on the inner surface of the side wall 43 in a face-to-face relation with an iron core 6 leaving an air gap. A magnetic disk support 15 is installed with a projection on the outer surface of the side wall 43 adjacent to the outer surface of the flange 29. A magnetic disk support 15 has a surface 45 on the side of the thick-wall portion 39. The surface 45 is on a plane perpendicular to the center shaft 31. An annular recess 16 is formed at the inner end of the surface 45.

Figure 2:
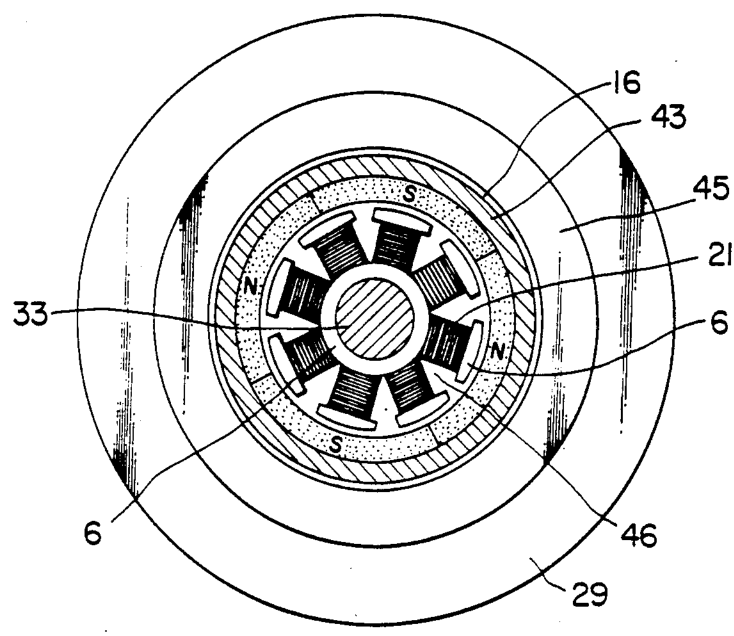
FIG. 2 is a sectional view taken on line II—II of FIG. 1.

The armature 5 has a coil 21 wound within a slot 46 provided in the core 6 as shown in FIG. 2 that can be energized so as to generate rotating fields that interact with those of the permanent magnet 17 to produce torque, causing the rotor 20*a* to rotate in the same direction as that of the rotating field. The rotor 20*a* is closely supported on the center shaft 31 by the bearings 37 and 38, and the thick-wall portion 39 firmly supports rotational parts such as the side wall 43 extending therefrom, the permanent magnet 17, the disk support 15 and the magnetic disk fixed on the support 15, thus providing an accurate rotation without rotation run-out.

Figure 3:
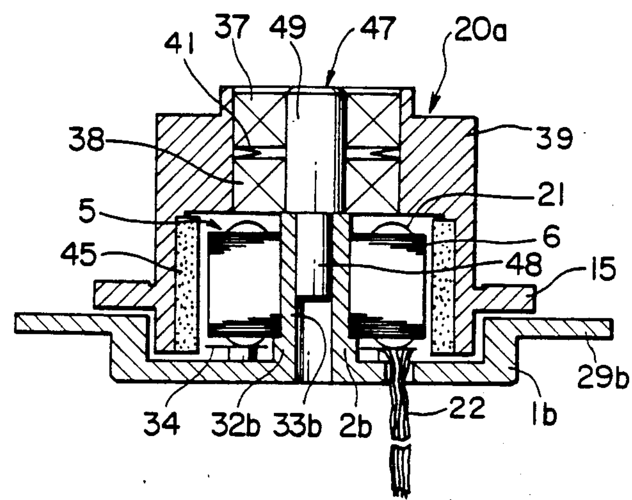
FIG. 3 is a longitudinal sectional view of an alternate embodiment of the invention.

FIG. 3 is a longitudinal sectional view of an alternate embodiment of the invention, in which parts indicated by the same reference numbers as those used in FIGS. 1 and 4 have the same construction as those shown therein, and parts different in construction from those shown in FIG. 4 are indicated by reference numerals with a letter "b" attached thereto. A circular dish-like mounting frame 1*b* is formed integral with a center axial pipe 2*b* projected in the central portion by aluminum die casting, and a laminated core 6 of an armature 5 is placed in contact with a large-diameter portion 32*b* and pressed and secured to a middle diameter portion 33*b* that abuts to a lower large-diameter portion 32*b* at the base of the center axial pipe 2*b*. A mechanism for bringing out lead wires of an armature coil 21 is similar to that shown in FIG. 1.

A small-diameter portion 48 of a steel center shaft 47 is pressed and secured into a center hole formed in a free end of the center axial pipe 2*b*, and a large-diameter portion 49 is brought into contact with the end of the center axial pipe 2*b*. The small-diameter portion 48 is long enough that the small-diameter portion 48 maintains alignment of the center axial pipe 2*b*. The wall thickness of the center axial pipe 2*b* is great enough to withstand the force used to press the small diameter portion 48 and also to minimize rotational vibrations of the rotor 20*a*.

The structure of the rotor 20*a* mounted on the large-diameter portion 49 is exactly the same as that shown in FIG. 1, and the ball bearings 37 and 38 are mounted in a manner similar to that shown in FIG. 1.

Although they are not shown in FIGS. 1 and 3, Hall elements to detect a rotational position of the permanent magnet 17 are mounted on the mounting frames 1*a* and 1*b*, and a detection signal therefrom controls the electrical energy supplied to the armature coil 21 to generate a rotating field.

As described above, according to the present invention, two ball bearings are provided on one side of the rotor to support the rotor 20*a* in a cantilever fashion. Therefore, the lead wires of the armature coil may be brought out the hole of the mounting frame directly without passing through the center shaft, thus making assembly of the motor simple as compared to the prior art; and a end plate for mounting one bearing can be eliminated to greatly reduce the cost.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A motor for driving a magnetic disk comprising:

a. a frame having a center shaft with a large-diameter portion, a middle portion of intermediate diameter, and a small-diameter portion, said frame including an aperture;

b. a core disposed on said middle portion of said center shaft and abutting said large-diameter portion;

c. an armature wound on said core, said armature receiving electric energy from wires passing through said aperture of said frame;

d. a pair of bearings separated by a pair of springs, said bearings mounted on said small-diameter portion of said center shaft;

e. a cup-shaped rotor pressed on said bearings to allow said cup-shaped rotor to rotate about said center shaft, armature and core, said rotor including a support means on a plane perpendicular to the axis of said center shaft; and f. a plurality of permanent magnets disposed within said rotor in magnetic engagement with said armature and said core, whereby when said armature is energized, said rotor rotates about the center shaft.

2. The motor of claim 1 wherein said core is made of ferromagnetic material.

3. The motor of claim 1 wherein said springs are Belleville springs.

4. The motor of claim 1 wherein said permanent magnets are disposed angularly.on an inside surface of said rotor so as to present alternate north and south poles in magnetic engagement with said armature and said core.

5. A motor for driving a magnetic disk comprising:

a. a frame having a center shaft, said shaft having a large-diameter outer portion, a middle-diameter outer portion and a hollow portion, said frame including an aperture;

b. a core disposed on said middle-diameter portion of said center shaft and abutting said large-diameter portion;

c. an armature disposed on said core and receiving electrical energy by wires passing through said aperture;

d. a second shaft having a large diameter portion, and a small-diameter portion sized to fit said hollow portion in said middle-diameter portion;

e. a pair of bearings separated by a pair of springs and mounted on said large-diameter portion of said second shaft;

f. a cup-shaped rotor mounted on said bearings to allow said rotor to rotate about said center shaft, said armature and said core, said rotor including a receiving support in a plane perpendicular to the axis of the center shaft; and g. a plurality of permanent magnets disposed within said cup-shaped rotor in magnetic engagement with said armature and said core, whereby when said armature is energized, said rotor rotates about said center shaft.

6. The motor of claim 5 wherein said core is made of ferromagnetic material.

7. The motor of claim 5 wherein said springs are Belleville springs.

8. The motor of claim 5 wherein said permanent magnets are disposed angularly on an inside surface of said rotor so as to present alternate north and south poles in magnetic engagement with said armature and said core.

* * * * *